US012726039B2

(12) United States Patent
Kikuchi

(10) Patent No.: US 12,726,039 B2
(45) Date of Patent: Sep. 1, 2026

(54) POWER STORAGE SYSTEM

(71) Applicant: TOYOTA JIDOSHA KABUSHIKI KAISHA, Toyota Aichi-ken (JP)

(72) Inventor: Yoshiaki Kikuchi, Toyota Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 555 days.

(21) Appl. No.: 18/369,879

(22) Filed: Sep. 19, 2023

(65) Prior Publication Data

US 2024/0106254 A1 Mar. 28, 2024

(30) Foreign Application Priority Data

Sep. 27, 2022 (JP) ................................ 2022-153661

(51) Int. Cl.

| | |
|---|---|
| ***H02J 7/92*** | (2026.01) |
| ***H01M 10/0525*** | (2010.01) |
| ***H01M 10/44*** | (2006.01) |
| ***H02J 7/50*** | (2026.01) |
| ***H02J 7/90*** | (2026.01) |

(52) U.S. Cl.

CPC ................ *H02J 7/92* (2026.01); *H02J 7/585* (2026.01); *H02J 7/977* (2026.01); *H01M 10/0525* (2013.01); *H01M 10/441* (2013.01); *H01M 10/443* (2013.01); *H02J 2207/20* (2020.01)

(58) Field of Classification Search

CPC .... H02J 7/92; H02J 7/585; H02J 7/977; H02J 7/443; H02J 7/0525; H02J 7/441; H02J 7/20; H02J 7/0071; H02J 7/0025; H02J 7/007194; H02J 2207/20; H01M 10/0525

USPC ....... 320/126, 127, 128, 130, 134, 135, 136, 320/137, 150

See application file for complete search history.

(56) References Cited

U.S. PATENT DOCUMENTS 10,418,827 B2 * 9/2019 Shin ........................ H02J 7/865
2012/0091966 A1 4/2012 Mori
(Continued)

FOREIGN PATENT DOCUMENTS

CN 113131011 A * 7/2021 .......... H01M 10/482
CN 118232443 A * 6/2024 ................ H02J 7/90
CN 118381168 A * 7/2024 ............. H02J 7/865
(Continued)

*Primary Examiner* — Rexford N Barnie
(74) *Attorney, Agent, or Firm* — Dinsmore & Shohl LLP

(57) ABSTRACT

A power storage system performing charging and discharging with an external system includes first and second battery units connected in parallel and each including a plurality of battery packs connected in parallel to a power converter. The power storage system includes a controller controlling operation of each power converter. The first and second battery units include a first battery pack and a second battery pack higher in internal resistance than the first battery pack, as the plurality of battery packs. The controller selects two second battery packs from a plurality of second battery packs included in the power storage system. In a standby state where charging and discharging are not performed with the external system, the controller performs, at different timings, control to discharge one of the selected two second battery packs and thereby charge the other, and control to discharge the other and thereby charge the one.

5 Claims, 2 Drawing Sheets

(56) References Cited

U.S. PATENT DOCUMENTS

| | | | | |
|---|---|---|---|---|
| 2014/0038020 | A1* | 2/2014 | Murata | H01M 10/617<br>429/120 |
| 2016/0344203 | A1* | 11/2016 | Poirier | H02J 7/52 |

FOREIGN PATENT DOCUMENTS

| | | | | | |
|---|---|---|---|---|---|
| CN | 119560655 | A | * | 3/2025 | H02J 7/933 |
| DE | 112017000969 | T5 | * | 12/2018 | H01M 10/48 |
| JP | 2011-188700 | A | | 9/2011 | |
| JP | 2012-085487 | A | | 4/2012 | |
| JP | 2013-169051 | A | | 8/2013 | |
| JP | 2014-103804 | A | | 6/2014 | |
| WO | WO-2011100686 | A1 | * | 8/2011 | H02J 7/575 |

* cited by examiner

EXTERNAL SYSTEM
900
920
940
PCS
910
LOAD
930
POWER STORAGE SYSTEM
1
CONTROLLER
9
TEMPERATURE SENSOR
30
BATTERY UNIT
10A
PCU
11
ECU
13
LFP BATTERY
12B
LFP BATTERY
12B
TERNARY BATTERY
12A
BATTERY UNIT
10B
PCU
11
ECU
13
TERNARY BATTERY
12A
LFP BATTERY
12B
TERNARY BATTERY
12A
UPPER-LEVEL CONTROLLER
20
NW

| BATTERY UNIT | TERMINAL | BATTERY TYPE | IDENTIFICATION NUMBER |
|---|---|---|---|
| FIRST BATTERY UNIT | FIRST TERMINAL | LFP BATTERY | #1 |
| | SECOND TERMINAL | LFP BATTERY | #2 |
| | THIRD TERMINAL | TERNARY BATTERY | #3 |
| SECOND BATTERY UNIT | FIRST TERMINAL | TERNARY BATTERY | #4 |
| | SECOND TERMINAL | LFP BATTERY | #5 |
| | THIRD TERMINAL | TERNARY BATTERY | #6 |
| THIRD BATTERY UNIT | FIRST TERMINAL | LFP BATTERY | #7 |
| | SECOND TERMINAL | TERNARY BATTERY | #8 |
| | THIRD TERMINAL | TERNARY BATTERY | #9 |
| | FIRST TERMINAL | LFP BATTERY | #10 |

FIRST PAIR

SECOND PAIR

FIG.3

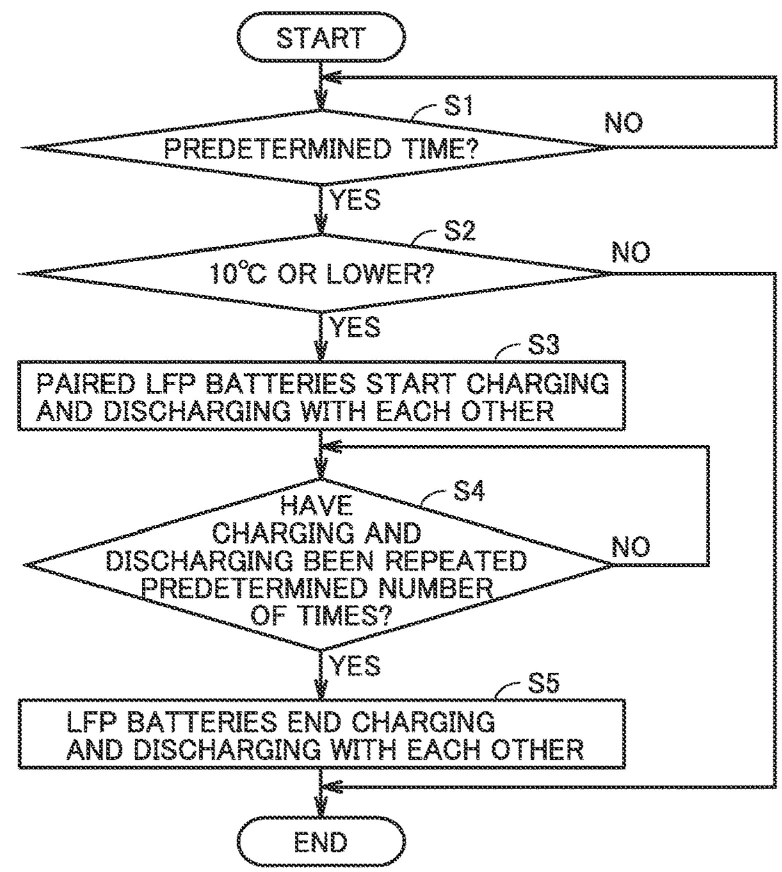

POWER STORAGE SYSTEM

This nonprovisional application is based on Japanese Patent Application No. 2022-153661 filed on Sep. 27, 2022 with the Japan Patent Office, the entire contents of which are hereby incorporated by reference.

BACKGROUND

Field

The present disclosure relates to a power storage system.

Description of the Background Art

Japanese Patent Application Laid-Open No. 2014-103804 discloses a battery system in which a plurality of battery packs are connected in parallel.

SUMMARY

In the system disclosed in Japanese Laid-Open No. 2014-103804, a plurality of battery packs may have different types. The internal resistances of different types of battery packs may be different from each other. In this case, particularly in the low temperature region, the input/output characteristics vary among battery packs. Therefore, it is desirable to suppress variation in input/output characteristics among different types of battery packs.

The present disclosure provides a power storage system capable of suppressing variation in input/output characteristics among different types of batteries.

According to an aspect of the present disclosure, a power storage system performs charging and discharging with an external system. The power storage system comprises a first battery unit and a second battery unit connected in parallel to each other, and each including a power converter and a plurality of battery packs connected in parallel with each other to the power converter. The power storage system further comprises a controller that controls operation of the power converter of each of the first battery unit and the second battery unit. The first battery unit and the second battery unit each include at least one first battery pack and at least one second battery pack as the plurality of battery packs. The second battery pack is different in type from the first battery pack. The second battery pack is higher in internal resistance than the first battery pack. The controller selects two second battery packs from a plurality of the second battery packs included in the power storage system. The controller performs first control and second control at respective timings different from each other, in a standby state in which charging and discharging are not performed between the power storage system and the external system, wherein the first control is performed to discharge one second battery pack of the selected two second battery packs and thereby charge the other second battery pack, and the second control is performed to discharge the other second battery pack and thereby charge the one second battery pack.

When charging and discharging are performed between the second battery packs as described above, each of the second battery packs is warmed. As a result, the internal resistance value of each of the second battery packs decreases. Therefore, the difference in internal resistance between the second battery pack and the first battery pack can be made smaller than the one before the temperature of the second battery pack is raised. Therefore, according to the above configuration, it is possible to suppress variation in input/output characteristics among different types of batteries.

In some embodiments, the first battery unit and the second battery unit are charged with electricity by the external system at least during late night hours. The first battery unit and the second battery unit discharges electricity to the external system at least during day hours. The controller repeatedly performs the first control and the second control at a predetermined time subsequent to the charging of the first and second battery units and preceding the discharging of the first and second battery units. According to this configuration, it is possible to suppress variation in output characteristics among input/output characteristics of the power storage system.

In some embodiments, the power storage system further comprises a sensor that detects a temperature of the power storage system. The controller repeatedly performs the first control and the second control on a condition that the temperature is a predetermined threshold value or lower at the predetermined time.

When the temperature is high, variation in input/output characteristics among different types of batteries is small. Therefore, when the temperature exceeds the threshold value, the first control and the second control may not necessarily be performed. Therefore, by executing the first control and the second controls only when the temperature is equal to or lower than the threshold value, power consumption in the power storage system can be reduced.

In some embodiments, the first battery unit includes a plurality of the second battery packs. The controller selects two second battery packs from the plurality of the second battery packs included in the first battery unit. According to this configuration, the number of pairs that can be simultaneously charged and discharged can be increased in the whole power storage system.

In some embodiments, the first battery pack is a ternary battery. The second battery pack is an iron-phosphate-based battery. The iron-phosphate-based battery has a high internal resistance particularly in a low temperature region. Therefore, in the low temperature region, the difference between the internal resistance of the iron-phosphate-based battery and the internal resistance of the ternary battery becomes large. Therefore, when a ternary battery and an iron-phosphate-based battery are mixed in a power storage system, variation in input/output characteristics becomes large in a low temperature region. Therefore, in the case where the ternary battery and the iron-phosphate-based battery are mixed in the power storage system, a significant effect can be obtained for suppressing variation.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a diagram showing data stored in an upper-level controller.

FIG. 3 is a flowchart for explaining the flow of processing in the power storage system.

DETAILED DESCRIPTION

Figure 1:
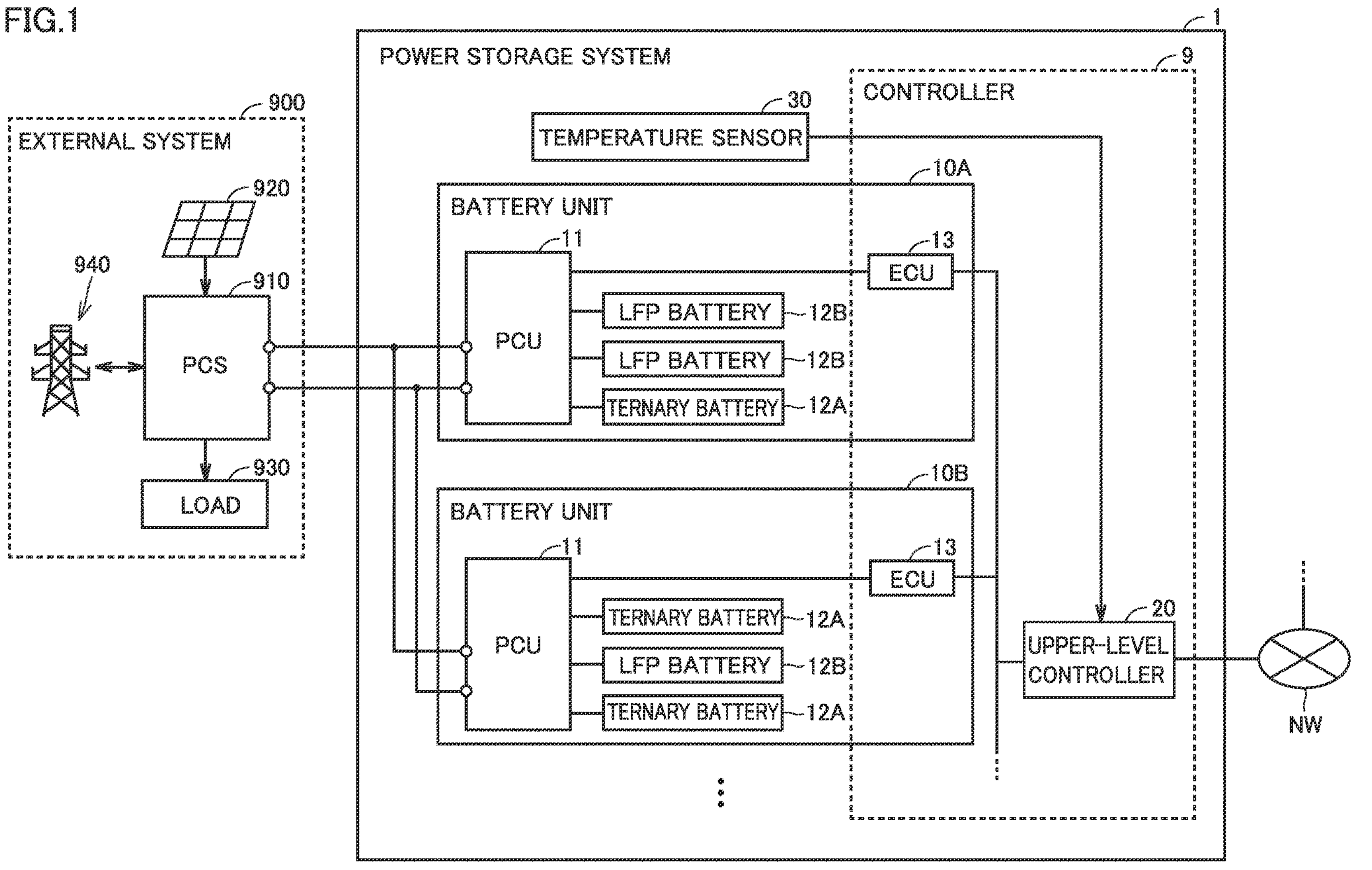
FIG. 1 is a diagram illustrating a configuration of a power storage system and an external system.

Hereinafter, embodiments of the present disclosure will be described with reference to the drawings. In the following description, the same members are denoted by the same reference numerals. Their names and functions are also the same. Therefore, detailed description thereof will not be repeated.

FIG. 1 is a diagram illustrating a configuration of a power storage system and an external system. As shown in FIG. 1, the power storage system 1 is connected to an external system 900 via a power line. The power storage system 1 can supply power from an external system 900. The power storage system 1 can be discharged to the external system 900.

The power storage system 1 includes a plurality of battery units 10A, 10B, . . . , an upper-level controller 20, and a temperature sensor (sensor) 30. Hereinafter, any one of the plurality of battery units 10A, 10B, . . . is also referred to as a "battery unit 10".

The battery unit (first battery unit) 10A includes a power control unit (PCU) 11, a ternary lithium ion battery (hereinafter referred to as a ternary battery) 12A, two iron-phosphate-based lithium ion batteries (hereinafter referred to as a LFP battery) 12B, and ECU (Electronic Control Unit) 13. The PCU 11 is a power conversion device including an inverter, a DC/DC converter, and the like. In the battery unit 10A, one ternary battery (first battery pack) 12A and two LFP batteries (second battery pack) 12B are connected in parallel to the PCU 11.

The battery unit (second battery unit) 10B includes a PCU 11, two ternary batteries (first battery assembly) 12A, one LFP battery (second battery assembly) 12B, and an ECU 13. In the battery unit 10B, two ternary batteries 12A and one LFP battery 12B are connected in parallel to the PCU 11. The battery unit 10B is different from the battery unit 10A in a combination of battery packs connected to the PCU 11.

Each of the ternary battery 12A and the LFP battery 12B is an example of a battery pack in which a plurality of single cells of the same type are packed. The battery unit 10 includes three battery packs connected in parallel to each other in the PCU 11. The power storage system 1 may include a battery unit 10 including only three ternary batteries 12A or a battery unit 10 including only three LFP batteries 12B.

In this example, as the PCU 11 and the ECU 13, the PCU and the ECU mounted on the vehicle are used, respectively. Similarly, as the ternary battery 12A and the LFP battery 12B, the assembled battery mounted on the vehicle is used. In this way, the power storage system 1 is constructed by using the unnecessary components of the vehicle. Specifically, the three-phase AC motor connected to the PCU of the vehicle is detached, and three battery packs (one in each of the U layer, the V layer, and the W layer) are connected.

The external system 900 includes PCS (Power Conditioning System) 910, a photovoltaic power generator 920, a load 930, and a power system 940. The battery units 10 (more specifically, the PCUs 11) are connected in parallel to the PCS 910.

The PCS 910 is a power converter capable of both AC/DC conversion (conversion from AC to DC) and DC/AC conversion (conversion from DC to AC). The PCS 910 receives DC power from, for example, the photovoltaic power generator 920. PCS 910 supplies AC power to load 930. The load 930 includes electric products (e.g., air conditioners and lighting equipment) used in households. The PCS 910 exchanges AC power with the power system 940.

The temperature sensor 30 measures the temperature of the power storage system 1. The temperature of the power storage system 1 may be the temperature of the ternary battery 12A, the temperature of the LFP battery 12B, the temperature around the ternary battery 12A, the temperature around the LFP battery 12B, the temperature inside a housing (not shown) that houses a plurality of battery units 10, or the temperature outside the housing (for example, outside air temperature). The upper-level controller 20 acquires information of the temperature measured by the temperature sensor 30.

Each ECU 13 includes a processor and a memory (both not shown). Each ECU 13 controls the battery unit 10. Each ECU 13 is communicably connected to the upper-level controller 20.

The upper-level controller 20 includes a processor and a memory (both not shown). The upper-level controller 20 sends a command to each ECU 13. The upper-level controller 20 is communicably connected to a server (not shown) via a network NW.

The internal resistance of the LFP battery 12B is higher than the internal resistance of the ternary battery 12A. In particular, the internal resistance of the LFP battery 12B increases in the low temperature region. In the power storage system 1 including different types of battery packs, the input/output characteristics (typically, the upper limit of chargeable/dischargeable power/current) vary for each battery pack due to the difference in internal resistance between battery packs, particularly in the low temperature region.

In the following, control for suppressing such variation in input/output characteristics will be described. Hereinafter, the upper-level controller 20 and the plurality of ECUs 13 are collectively referred to as a "controller 9".

In the power storage system 1, each battery unit 10 is charged by the external system 900 at least in a late night time period. Each battery unit 10 discharges to the external system 900 at least in the daytime period. Specifically, in each battery unit 10, each of the three battery packs is supplied with power from the external system 900 in at least a late night time period. Each of the three battery packs discharges to the external system 900 at least in the daytime period.

In a standby state in which charging and discharging are not performed between the power storage system 1 and the external system 900, the power storage system 1 executes control for suppressing variation in the input/output characteristics described above. That is, the power storage system 1 does not perform charging and discharging with the external system 900 when executing control for suppressing variation in input/output characteristics.

Typically, the power storage system 1 executes control to suppress variation in input/output characteristics at a predetermined time (e.g., 6 p.m.) after the charging and before the discharging. More specifically, the power storage system 1 executes control to suppress variation in input/output characteristics on condition that the temperature detected by the temperature sensor 30 is equal to or lower than a predetermined threshold value (for example, 10 degrees) at the predetermined time.

The control for suppressing variation in input/output characteristics will be described in detail below with reference to FIG. 2.

FIG. 2 is a diagram showing data D stored in the upper-level controller 20. As shown in FIG. 2, the data D indicates which type of battery pack is connected to each terminal (the terminal of the U layer, the terminal of the V layer, and the terminal of the W layer) of each battery unit 10. In data D, identification numbers are assigned to all terminals for management.

The upper-level controller 20 creates a plurality of pairs of LFP batteries 12B. In this example, the upper-level controller 20 has a pair (hereinafter also referred to as a "first pair") of the LFP battery 12B connected to the first terminal of the first battery unit corresponding to the battery unit 10A and the LFP battery 12B connected to the second terminal of the first battery unit. That is, the upper-level controller 20 associates the LFP battery of the identification number #1 with the LFP battery of the identification number #2.

Similarly, the upper-level controller 20 has a pair (hereinafter also referred to as a "second pair") of the LFP battery 12B connected to the second terminal of the second battery unit corresponding to the battery unit 10B and the LFP battery 12B connected to the first terminal of the third battery unit (corresponding to the battery unit 10C not shown). That is, the upper-level controller 20 associates the LFP battery of the identification number #5 with the LFP battery of the identification number #7.

Further, in this example, the LFP battery 12B connected to the first terminal of the fourth battery unit (corresponding to the battery unit 10D not shown) and the LFP battery 12B connected to the first terminal of the fifth battery unit (corresponding to the battery unit 10E not shown) are paired (hereinafter also referred to as "third pair").

In this way, the upper-level controller 20 performs pairing for the plurality of LFP batteries 12B included in the power storage system 1. The pairing of the LFP batteries 12B is not particularly limited. The upper-level controller 20 may perform pairing in the order of the smaller identification number. Alternatively, the upper-level controller 20 may prioritize pairing of the LFP batteries 12B in the same battery unit 10.

In the standby state described above, the upper-level controller 20 repeatedly executes control of charging the LFP battery 12B of the identification number #2 by discharging the LFP battery 12B of the identification number #1 by sending a command to the ECU 13 of the battery unit 10A, and control of charging the LFP battery 12B of the identification number #1 by discharging the LFP battery 12B of the identification number #2, at different timings. That is, both of the two LFP batteries 12B repeat charging and discharging. When one LFP battery 12B is discharging, the other LFP battery 12B is charged by the discharging.

As described above, the upper-level controller 20 causes the ECU 13 of the battery unit 10A to execute charging/discharging process between the first pair of LFP batteries 12B. Specifically, the upper-level controller 20 continues the charging/discharging process until the number of repetitions reaches a threshold value (predetermined number of repetitions). Alternatively, the upper-level controller 20 continues the charging/discharging process until a predetermined time has elapsed. Alternatively, when the temperature sensor 30 measures the temperature of the LFP battery 12B, the upper-level controller 20 continues the charging/discharging process until the detection result of the temperature sensor 30 reaches a predetermined temperature (for example, 10 degrees).

Further, the upper-level controller 20 sends commands to the ECU 13 of the battery unit 10B and the ECU 13 of the battery unit 10C. Thus, the upper-level controller 20 repeatedly executes control of charging the LFP battery 12B of the identification number #7 by discharging the LFP battery 12B of the identification number #5 and control of charging the LFP battery 12B of the identification number #5 by discharging the LFP battery 12B of the identification number #7 at different timings. That is, the upper-level controller 20 causes the ECU 13 of each of the battery units 10B and 10C to execute charging/discharging process between the second pair of LFP batteries 12B.

Similarly, the upper-level controller 20 causes the ECU 13 of each of the battery units 10D and 10E (not shown) to execute charging/discharging process between the third pair of LFP batteries 12B.

The charging/discharging process between the first pair of LFP batteries 12B and the charging/discharging process between the second pair of LFP batteries 12B can be performed simultaneously. On the other hand, the charging/discharging process between the third pair of LFP batteries 12B cannot be performed simultaneously with the charging/discharging process between the second pair of LFP batteries 12B due to the circuit configuration. Therefore, in this example, the charging/discharging process between the LFP batteries 12B of the third pair is performed after the charging/discharging process between the LFP batteries 12B of the first pair and the charging/discharging process between the LFP batteries 12B of the second pair are completed.

Each ECU 13 operates the PCU 11 based on a command from the upper-level controller 20. Thus, the above-described LFP batteries 12B are charged and discharged. By such charging and discharging, the LFP battery 12B is warmed. As a result, the internal resistance of the LFP battery 12B decreases.

Therefore, according to the power storage system 1, the difference in internal resistance between the ternary battery 12A and the LFP battery 12B can be made smaller than that before raising the temperature of the LFP battery 12B. Therefore, it is possible to suppress variation in input/output characteristics among different types of batteries.

FIG. 3 is a flowchart for explaining the flow of processing in the power storage system 1. As shown in FIG. 3, in step S1, the upper-level controller 20 determines whether or not it is a predetermined time. More specifically, the upper-level controller 20 has a clock (not shown), and determines whether or not it is a predetermined time based on the clock.

When determining that it is the predetermined time (YES in step S1), the upper-level controller 20 determines whether or not the detection result of the temperature sensor 30 is 10 degrees or lower in step S2. When determining that it is not the predetermined time (NO in step S1), the upper-level controller 20 waits until the time reaches the predetermined time.

When determining that the temperature is 10 degrees or lower (YES in step S2), the upper-level controller 20 sends a command to the ECU 13 in step S3 to start charging and discharging of the pair of LFP batteries 12B. When determining that the temperature exceeds 10 degrees (NO in step S2), the upper-level controller 20 ends the series of processes.

After step S3, in step S4, the upper-level controller 20 determines whether or not charging and discharging have been repeated a predetermined number of times for each pair. Instead of the number of times, the upper-level controller 20 may make a determination using the elapsed time, the detection result of the temperature sensor 30, or the like, as described above.

When determining that charging and discharging are not repeated a predetermined number of times (YES in step S4), the upper-level controller 20 returns the processing to step S4 and causes the ECU 13 to repeat charging and discharging until the number of repetitions of charging and discharging reaches a predetermined number of times. When determining that charging and discharging have been repeated a predetermined number of times (YES in step S4), the upper-level controller sends a command to the ECU 13 in step S5 to end charging and discharging between the LFP batteries 12B.

BRIEF SUMMARY (1) Focusing on the battery units 10A and 10B, the processing of the power storage system 1 is summarized as follows. The power storage system 1 performs charging and discharging with the external system 900. The power storage system 1 includes a PCU 11 and a plurality of battery packs connected in parallel to the PCU 11, and battery units 10A and 10B connected in parallel to each other. The power storage system 1 further includes a controller 9 for controlling the operation of each PCU 11 of the battery units 10A and 10B.

Each of the battery units 10A and 10B includes at least one ternary battery 12A and at least one LFP battery 12B as a plurality of battery packs. The LFP battery 12B has higher internal resistance than the ternary battery 12A.

The controller 9 selects two LFP batteries 12B from a plurality of LFP batteries 12B included in the power storage system 1 (battery units 10A and 10B). In the example of FIG. 2, the controller 9 selects the LFP battery 12B having the identification number #1 and the LFP battery 12B having the identification number #2. The selected two LFP batteries 12B are paired.

In a standby state in which charging and discharging are not performed with the external system 900, the controller 9 executes a first control of discharging one of the two selected LFP batteries 12B to charge the other and a second control of discharging the other to charge the one at different timings.

Similarly, focusing on the battery units 10B and 10C, the processing of the power storage system 1 is summarized as follows. Each of the battery units 10B and 10C includes at least one ternary battery 12A and at least one LFP battery 12B as a plurality of battery packs.

The controller 9 selects two LFP batteries 12B from a plurality of LFP batteries 12B included in the power storage system 1 (battery units 10B and 10C). In the example of FIG. 2, the controller 9 selects the LFP battery 12B having the identification number #5 and the LFP battery 12B having the identification number #7. The selected two LFP batteries 12B are paired.

In a standby state in which charging and discharging are not performed with the external system 900, the controller 9 executes a first control of discharging one of the two selected LFP batteries 12B to charge the other and a second control of discharging the other to charge the one at different timings.

When charging and discharging are performed between the LFP batteries 12B, each LFP battery 12B is warmed. As a result, the internal resistance value of each LFP battery 12B decreases. Therefore, the difference in internal resistance between the ternary battery 12A and the LFP battery 12B can be made smaller than that before raising the temperature of the LFP battery 12B. Therefore, according to the power storage system 1, it is possible to suppress variation in input/output characteristics among different types of batteries.

(2) The battery unit 10 is charged by the external system 900 at least in a late night time period. The battery unit 10 discharges to the external system 900 at least in the daytime period. The controller 9 repeatedly executes the first control and the second control at a predetermined time after the charging and before the discharging. According to this configuration, it is possible to suppress variation in output characteristics among input/output characteristics of the power storage system 1.

(3) The power storage system 1 further includes a temperature sensor 30 for detecting the temperature of the power storage system 1. The controller 9 repeatedly executes the first control and the second control on condition that the temperature is equal to or lower than a predetermined threshold value at a predetermined time.

When the temperature is high, variation in input/output characteristics between different types of batteries is small. Therefore, when the temperature exceeds the threshold value, the first and second controls may not necessarily be performed. Therefore, by executing the first and second controls only when the temperature is equal to or lower than the threshold value, power consumption in the power storage system 1 can be suppressed.

(4) By the controller 9 selecting two LFP batteries 12B from a plurality of LFP batteries 12B included in the battery unit 10, the number of pairs which can be simultaneously charged and discharged can be increased in the whole power storage system 1. For example, by the controller 9 selecting two LFP batteries 12B from the two LFP batteries 12B included in the battery unit 10A, the number of pairs that can be simultaneously charged and discharged can be increased.

(5) The LFP battery 12B has a high internal resistance particularly in a low temperature region. Therefore, in the low temperature region, the difference between the internal resistance of the LFP battery 12B and the internal resistance of the ternary battery 12A becomes large. Therefore, as in this example, when the ternary battery 12A and the LFP battery 12B are mixed in the power storage system 1, variation in input/output characteristics becomes large in the low temperature region. Therefore, in the power storage system 1 in which the ternary battery 12A and the LFP battery 12B are mixed, a large effect can be obtained as a variation suppression.

Modified Example (1) In the above description, the ternary battery and the LFP battery are exemplified as different types of battery packs, but the present disclosure is not limited thereto. For two types of battery packs having different internal resistances, the charging/discharging process of the battery packs described above can be performed.

(2) In the above description, the three battery packs are connected to the power converter (the PCU 11 in this example). For example, two or four or more battery packs may be connected to the power converter.

Appendix (1) A control method for a power storage system that performs charging and discharging with an external system, the power storage system including a first battery unit and a second battery unit connected in parallel to each other, the first battery unit and the second battery units each including at least one first battery pack and at least one second battery pack as a plurality of battery packs connected in parallel to each other, and the second battery pack being different in type from the first battery pack and higher in internal resistance than the first battery pack, the control method comprising:

selecting, by a controller of the power storage system, two second battery packs from a plurality of the second battery packs included in the power storage system;

performing, by the controller, first control and second control at respective timings different from each other, in a standby state in which charging and discharging are not performed between the power storage system and the external system, wherein the first control is performed to discharge one second battery pack of the selected two second battery packs and thereby charge the other second battery pack, and the second control is performed to discharge the other second battery pack and thereby charge the one second battery pack.

(2) A program causing one or more processors (the processor included in the controller 9 (in this example, the processor of the upper-level controller 20, the processor of the ECU 13) to perform each of the steps of the control method.

(3) A non-transitory computer-readable storage medium having the program stored therein.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power storage system that performs charging and discharging with an external system, the power storage system comprising:

a first battery unit and a second battery unit connected in parallel to each other, and each including a power converter and a plurality of battery packs connected in parallel with each other to the power converter; and a controller that controls operation of the power converter of each of the first battery unit and the second battery unit, wherein the first battery unit and the second battery unit each include at least one first battery pack and at least one second battery pack as the plurality of battery packs, and the second battery pack is different in type from the first battery pack and higher in internal resistance than the first battery pack, and the controller selects two second battery packs from a plurality of the second battery packs included in the power storage system, and performs first control and second control at respective timings different from each other, in a standby state in which charging and discharging are not performed between the power storage system and the external system, wherein the first control is performed to discharge one second battery pack of the selected two second battery packs and thereby charge the other second battery pack, and the second control is performed to discharge the other second battery pack and thereby charge the one second battery pack.

2. The power storage system according to claim 1, wherein the first battery unit and the second battery unit are charged with electricity by the external system at least during late night hours, and discharge electricity to the external system at least during day hours, and the controller repeatedly performs the first control and the second control at a predetermined time subsequent to the charging of the first and second battery units and preceding the discharging of the first and second battery units.

3. The power storage system according to claim 2, further comprising a sensor that detects a temperature of the power storage system, wherein the controller repeatedly performs the first control and the second control on a condition that the temperature is a predetermined threshold value or lower at the predetermined time.

4. The power storage system according to claim 1, wherein the first battery unit includes a plurality of the second battery packs, and the controller selects two second battery packs from the plurality of the second battery packs included in the first battery unit.

5. The power storage system according to claim 1, wherein the first battery pack is a ternary lithium ion battery, and the second battery pack is an iron-phosphate-based lithium ion battery.

* * * * *